Figure 1:
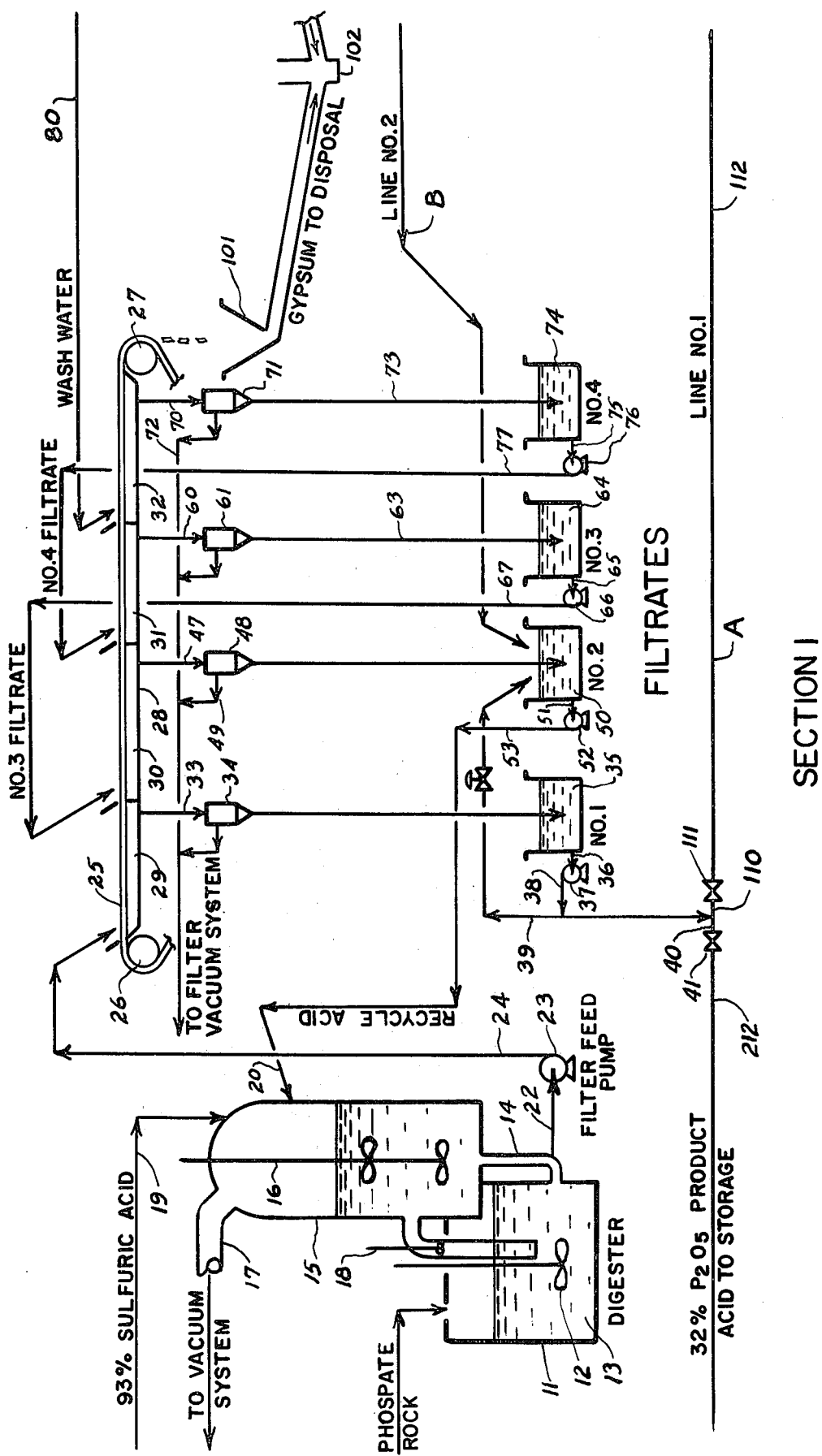

United States Patent [19]

Somerville

[11] 4,053,563
[45] Oct. 11, 1977

[54] HYBRID PHOSPHORIC ACID PROCESS

[76] Inventor: Robert L. Somerville, Rte. 1, Box 256, Old Amwell Road, Neshanic, N.J. 08853

[21] Appl. No.: 708,077

[22] Filed: July 23, 1976

Related U.S. Application Data

[63] Continuation of Ser. No. 630,363, Nov. 10, 1975, abandoned, which is a continuation of Ser. No. 511,315, Oct. 1, 1974, abandoned, which is a continuation of Ser. No. 320,087, Jan. 2, 1973, abandoned.

[51] Int. Cl.$^2$ ............................................. C01B 25/16
[52] U.S. Cl. .................................................... 423/320
[58] Field of Search ......................................... 423/320

[56] References Cited

U.S. PATENT DOCUMENTS 3,472,619  10/1969  Chelminski ........................... 423/320

OTHER PUBLICATIONS

A. V. Slack, *Phosphoric Acid*, 1968.

*Primary Examiner*—O. R. Vertiz
*Assistant Examiner*—Eugene T. Wheelock
*Attorney, Agent, or Firm*—Eugene E. Geoffrey, Jr.

[57] ABSTRACT

A wet phosphoric acid process involving operation of two streams, substantially equivalent, one producing phosphoric acid of a particular level of concentration, and gypsum as a by-product, and the other phosphoric acid of a different concentration, producing calcium sulfate hemihydrate as a by-product, with means for interconnecting and coordinately operating the processes so as to produce a single acid product stream of a higher concentration than the sum of the individual streams. The method consists of employing acid from one process as a wash in the second and balancing the flow streams to produce the combined product acid of enhanced final concentration and the plants involved in carrying into effect this method of operation.

3 Claims, 2 Drawing Figures

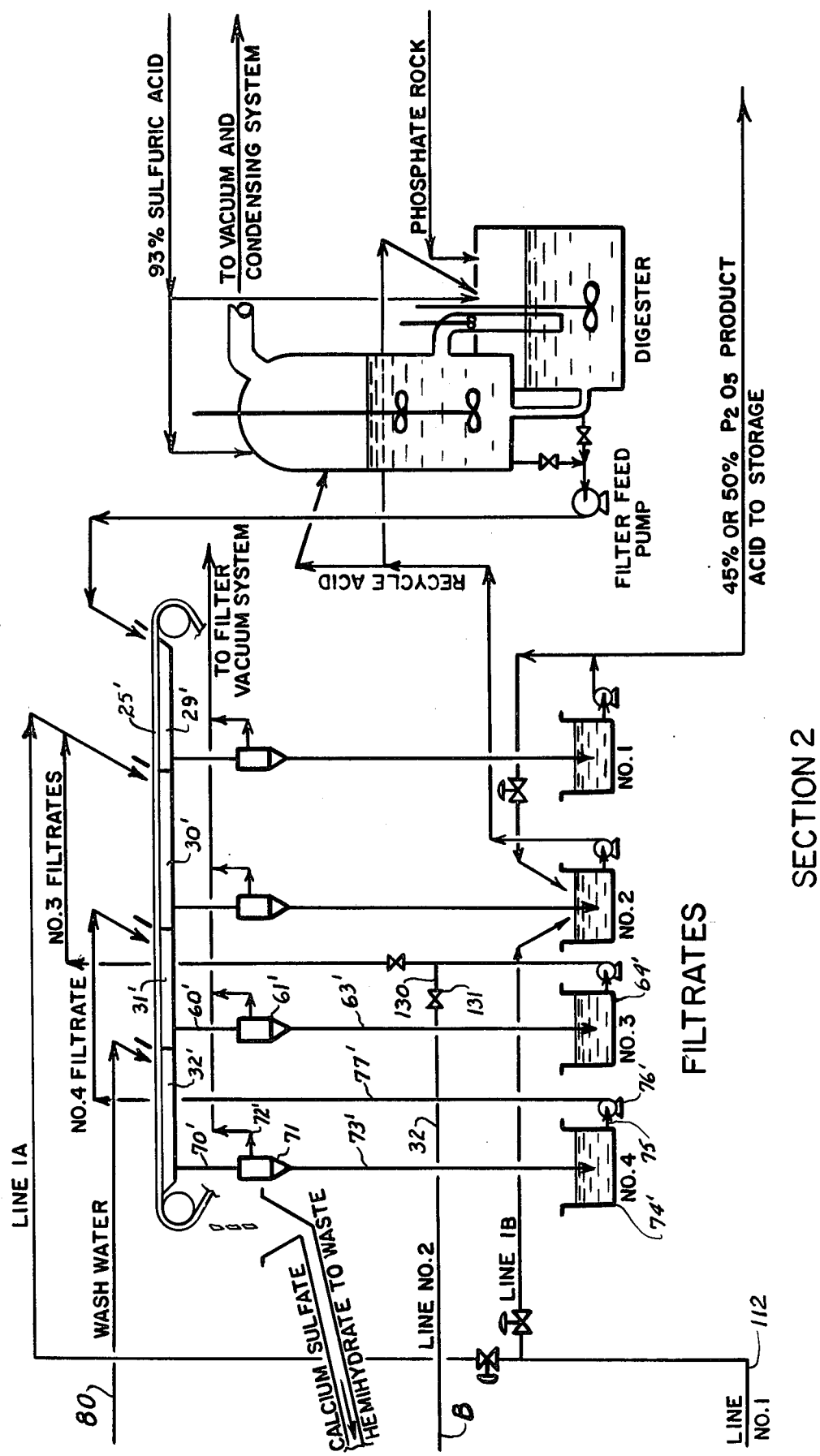

HYBRID PHOSPHORIC ACID PROCESS

RELATED APPLICATIONS

This application is a continuation of my copending application Ser. No. 630,363, filed Nov. 10, 1975, now abandoned which in turn is a continuation of my application Ser. No. 511,315, filed Oct. 1, 1974, now abandoned, which in turn is a continuation of my application Ser. No. 320,087, filed Jan. 2, 1973 now abandoned.

DESCRIPTION OF THE INVENTION

The invention is involved in a process for operating a dual phosphoric acid plant wherein the plant consisting of essentially two similar installations can be operated in either of two modes, that is, a gypsum process and a hemihydrate process with interconnection to maximize the use of water, water deficits and wash acids so that a single high concentration phosphoric acid can be obtained from it and the physical interconnection between the plants for accomplishing this result.

BACKGROUND OF THE INVENTION

The manufacture of phosphoric acid by the wet process which involves reacting phosphate rock of 30–39% $P_2O_5$ content with concentrated sulfuric acid to release phosphoric acid and the recovery of the phosphoric acid therefrom, with the conversion of the sulfuric acid to insoluble calcium sulfate, requires in one way or another the balancing of a number of variables, such as free sulfuric acid, temperatures and principally the recovery of phosphoric acid of a given level of concentration and the disposal of the calcium sulfate either as gypsum or as hemihydrate. Generally, plants will be designed to produce the gypsum by-product or the hemihydrate by-product and with this variable the concentration of phosphoric acid which can be produced is essentially fixed. The characteristic gypsum process plant will produce a 32% $P_2O_5$ acid, whereas the hemihydrate plant characteristically will produce a 45–50% $P_2O_5$ product. Generally, operation of the plant in either mode can be judged for its efficiency by the steadiness by which it will produce an acid of the mean concentration, which, of course, is related to the phosphate rock used. Generally, a phosphate rock of about Kola grade namely 30–39% $P_2O_5$ is preferred.

The various processes for producing wet process phosphoric acid are well known and have been discussed in a great deal of detail in various publications, the best known being the Fertilizer Science and Technology series Volume 1, Part 1, "Phosphoric Acid," edited by A. V. Slack and published by Marcel Dekker.

The commonly used process is referred to as the gypsum or dihydrate process. This process produces a product acid which contains 30–32% $P_2O_5$ in solution and 1.5–3.0% sulfuric acid plus assorted soluble impurities including iron, aluminum and fluosilicic acid in the product and in some cases a lower percentage of other impurities.

The disadvantages of higher corrosion rates, greater fume problems, difficulty with filtration and higher losses of $P_2O_5$ in the calcium sulfate waste have generally deterred operators from using the hemihydrate process.

These disadvantages are now being overcome by improvements in materials of construction, operating technology and improved equipment. Perhaps the principle improvement in equipment is the development of the Landskrona continuous travelling belt filter.

It is a basic object of this invention to provide a means for expanding or more than doubling the capacity of an existing phosphoric acid plant by essentially duplicating the facility and interconnecting the new with the old to provide a means for operation in either the gypsum of the hemihydrate mode to produce a higher than 50% $P_2O_5$ acid.

It is another object of the invention to provide a means for the operation of the phosphoric acid plant to enhance the recovery of $P_2O_5$ from the phosphate rock, when operating to produce concentrated (45% $P_2O_5$) phosphoric acid.

Other objects and advantages of the invention will in part be obvious and in part appear hereinafter.

DESCRIPTION OF THE INVENTION

The invention accordingly is embodied in an installation for the manufacture of phosphoric acid comprising a dual installation, a first and a second section, in which the two sections may or may not be duplicates of each other, interconnected by means of an acid line in the first instance from the first to the second to bring phosphoric acid thereto as a wash and in the second instance from the second section to the first section to join recycle acid therein, so that, overall, the operation of the two processes can be conducted in either the gypsum or the hemihydrate mode, with maximum economy of water, thereby maximizing the recovery of $P_2O_5$ in the final product acid. Briefly, the physical installation can consist of essentially any wet process installation for reacting phosphate rock with sulfuric acid, venting volatile gases, inducing intimate contact of the materials and, thereupon, feeding the resulting slurry of gypsum and phosphoric acid to a tilting pan or a travelling belt type filter, a preferred version of this being the Landskrona type, removing filtrate from the filter in the three or four stages called for, the final stage of filtration involving the use of wash water, all the filtrates being collected, recycled and forwarded in a counter current manner as is conventional in these operations and arranging these operations so that the acid product, from section 1 can alternatively be taken off to product, or be diverted by means of a line, called the first diversion line to the travelling belt filter in the second stage of the phosphate rock reaction plant which is operating to produce hemihydrate, there to be used as a wash in the early stage of filtration, the product there passing through the usual rock stages, the final wash water and the said branch line 1 also being branched to permit passing some of the acid to join the second filtrate from said second stage of the process, with further arrangement of pipe line, called the second diversion line, to take filtrate from the third stage of filtration on the second stage of the process, recycling some to wash and other to wash in the first process. That is, it is essential in this invention to consider the plant as consisting of two approximately duplicate and approximately equal capacity phosphate rock operations wherein filtrate from the one is fed to the second as wash and filtrate from the second is fed to the first as wash, thereby effecting economies of water and removing from the overall operation a product acid of enhanced overall $P_2O_5$ concentration.

To reduce the definition of the invention to specific terms it will be helpful to refer to the accompanying drawing, consisting of FIG. 1 and FIG. 1A, which show a flow diagram illustrating an installation wherein phosphoric acid plants illustrated are shown as mirror images of each other.

Referring now specifically to the drawings in Section 1, which is the flow diagram of an essentially conventional type wet process phosphoric acid operation, phosphate rock is fed by line 10, to the reactor digester 11, equipped with an agitator 12, to join the body 13, of reactant acid and phosphate rock therein. Connection by line 14, is made to a second stage reactor 15, equipped with agitator 16, and connected to vacuum system by line 17, and having a return line 18, to the digester 11. To this second stage reactor concentrated 93% sulfuric acid is fed by line 19. Also recycle acid by line 20.

The reaction is conducted in this two phase unit, communication between the units and stirring being maintained by the equipment generally indicated. Volatiles including water vapor are drawn off by the vacuum system for disposal or recovery of fluosilicic acid, which is a normal by-product of the process and, ultimately, when the conditions reach equilibrium, product is pumped by line 22 and pump 23 to line 24 to be delivered as a calcium sulfate slurry to belt 25 of the travelling belt filter.

This unit may be any tilting pan or moving belt filter in which the filtrate is abstracted in stages. For purposes of my operations I have found the Landskrona travelling belt filter manufactured by Nordengren Patente AB Corporation Landskrona Sweden to be useful. This filter is distributed in the United States by Robert L. Somerville & Associates.

Diagrammatically, the filter consists of the belt 25 with essential drive wheels 26 and 27 at its respective ends and under the belt is the indicated four stage filtrate receiving section 28 consisting of stages 29, 30, 31, 32. Filtrate from stage 29 passes by line 33 to collector unit 34 where connection is made to the filter vacuum system and the rest is fed to filtrate collection 35 from which it is pumped by line 36, pump 37 and line 38 to product line 39 which divides and can feed via line 40 and valve 41 to product collecting stage 42.

The filtrate from the second stage 30 of the filtering operation passes by line 47 to collecting stage 48 where connection is made to line 49 to the vacuum filter system and the filtrate passes as product to a stage identified as No. 2 filtrate, namely, product collection stage 50 from which it can be fed by line 51, pump 52 and line 53 as a recycle acid to line 20 in the reactor system.

In the third stage of filtration, filtrate is fed by line 60 to collection 61 where it is connected to the vacuum filter system, product going by line 63 to the third stage of filtrate collection 64 where it can be fed by line 65 to pump 66 and line 67 as No. 3 filtrate to be fed as wash onto the second stage of filtration.

Filtrate from the fourth stage of filtration is taken by line 70 to stage 71 where connection is made to the filter vacuum system by line 72 and the filtrate is fed by line 73 to the product stage collection 74 of fourth stage of filtrate collection where line 75 feeds it to pump 76 and line 77 to take it as a wash for the third stage of filtration, that is the fourth stage filtrate is used as third stage filter wash.

Fresh water in the amount needed for close control of the process, and this is one of the points of control of my operation of the dual system, is fed by line 80 to the final stage of filtration where the filtrate consisting of the wash water with the additional amounts of acid washed out of the product slurry is fed by line 70 to stage 71 vacuum filter connection by line 72, and by line 73 is fed to the collection stage No. 4, which is receptacle 74, connected by line 75 to pump 76 and line 77, to be used as No. 4 filtrate wash in the third stage of filtration.

The relatively dry gypsum appears as a product at the end of the belt 25 and is fed to receptacle 101 which takes the gypsum to any disposal unit 102.

My invention involves the introduction into this system of the second unit of operation, as in FIG. 1A, which is capable of operating as a gypsum or hemihydrate unit and, for purposes of illustration herein, it is shown as a mirror image of the diagram of FIG. 1 herein, all parts being identified by the same numbers, but with primes to indicate they are associated with Section 2 of the dual plant, with interconnection to effectuate the dual operation.

Sections 1 and 2 are interconnected by two lines which I have designated as line A which is formed of connection 110, valve 111, and line 112 which leads back to join No. 3 filtrate in No. 2 section of the plant and is used as a wash in the second stage of filtration there.

The second addition is line B which is connected from No. 3 filtrate recirculation line of Section 2 by line 130, valve 131, and line 132 to the No. 2 filtrate receptacle of Section 1.

The solid product of Section 2 is available to be disposed of with the gypsum of Section 1.

In Section 2, which has been diagrammed as a hemihydrate process operation, being a lesser recovery of phosphoric acid from a given amount of rock, I have indicated product acid being recovered at 45-50%. Also in the reactor of Section 1, I have indicated alternative possibilities of feeding recycle acid to the primary digester as well as to the secondary digester. Similarly, I have indicated the possibility of feeding the 93% sulfuric acid to the primary digester as well as the secondary digester.

It is by means of these alterations in the dual process installation that I manage to effect substantial economies in the operation of plants as the following operating data will show:

My method of operating results in a major improvement which accrues to an operator having two adjacent operating plants of approximately equal capacity. This technique allows the plant operator to run one section as a gypsum plant and one section as a hemihydrate plant. The gypsum process section continues to operate at its normal high yield while the hemihydrate section operates at its usual yield and capacity but the entire production of phosphoric acid is produced at the higher concentration and low free sulfuric acid content characteristic of the hemihydrate process. In fact, the combined production may be more concentrated than is possible from a hemihydrate process operating independently.

In order to do this, the two pipelines identified as A, and B, with their assorted control valves must be installed between the two plants.

To explain why this operations is possible, it is necessary to show in some detail the operation and material balances of each section. For this purpose I am using data which assume a gypsum process plant operating on Kola phosphate rock to produce 250 metric tons per day $P_2O_5$ and a hemihydrate process plant producing also 250 tons per day $P_2O_5$.

The gypsum process plant is limited to producing acid of 32% $P_2O_5$ concentration, since this is the highest practical concentration of $P_2O_5$ at which good filterable gypsum can be formed. A water balance around this plant is approximately as follows: All data are in kilograms per hour:

| Water in Plant | | |
|---|---|---|
| Sulfuric Acid 93% | | 1,882 |
| Minimum Filter Wash Water | | 30,618 |
| Total | | 32,500 |
| Water out of Plant | | |
| 1. Product Acid 32% $P_2O_5$ containing: | | |
| $P_2O_5$ | 10,417 | |
| $H_2SO_4$ | 651 | |
| $H_2SiF_6$ | 649 | |
| Misc. impurities | 370 | |
| Chem. combined water | 3,965 | |
| Free or dilution water | 16,500 | (by difference) |
| Total 32% acid | 32,552 | |
| 2. Gypsum Tailings: | | |
| Water of crystallization | 8,846 | |
| Moisture or free water in cake | 9,866 | |
| Total in gypsum | 18,712 | |
| 3. Evaporation from the vacuum cooling system due to heat of reaction | 13,265 | |
| Total water out | | 48,477 |
| Total water in | | 32,500 |
| Water deficit | | 15,977 |

This water deficit is ordinarily made up by diluting the sulfuric acid to 60-70% concentration and additional filter wash water. This of course is convenient for the operator and makes efficient operation easy, but is not essential.

The water balance in a plant operating on Kola apatite using the hemihydrate process is approximately as follows:

| Water in Plant | | |
|---|---|---|
| Sulfuric acid 92% | | 1,882 |
| Filter Wash Water | | 25,928 |
| Total water in | | 27,810 |
| Water out of Plant | | |
| 1. Product acid 45% $P_2O_5$: | | |
| $P_2O_5$ | 10,417 | |
| $H_2SO_4$ | 347 | |
| $H_2SiF_6$ | 104 | |
| Misc. impurities 370 | | |
| Chem. Combined water | 3,965 | |
| Free or dilution water | 7,950 | (by difference) |
| Total | 23,153 | |
| 2. Hemihydrate filter cake: | | |
| Water of crystallization | 2,211 | |
| Assume 25% moisture in cake | 9,549 | |
| Total water in hemi cake | 11,760 | |
| 3. Evaporation from vacuum cooling system due to heat of reaction | 8,210 | |
| Total water out of plant | | 27,920 |
| Total water in | | 27,810 |
| Water deficit | | 110 |

It is apparent that 45% $P_2O_5$ is about as strong an acid as can be produced in the hemihydrate plant since removing 110 kgs. water from the product increases the strength only to 45.2% $P_2O_5$.

I have found a simple operating procedure which enables us to use the water deficit of the gypsum process plant in the hemihydrate plant with no additional equipment except for the two pipelines identified as A and B and assorted control valves and flow control instruments. No important changes in operating conditions in either plant are required, but the final result, as can be seen from the following tabulation, is that all product acid can be produced at a concentration of 52.6% $P_2O_5$.

| | |
|---|---|
| 32% Product acid - total | 32,552 |
| 45% Product from hemi plant | 23,153 |
| Less water deficit - gypsum plant | 15,977 |
| Less water deficit - hemi plant | 110 |
| Total Product acid | 39,618 |
| $P_2O_5$ Content of Product | 20,834 |
| Equivalent of 52.6% $P_2O_5$ | |

It may be found that other considerations such as acid viscosity, crystal formation may dictate a lesser concentration but the ultimate potential based upon the water balance is a very important objective.

The analysis of the Kola apatite used in this example is

| | |
|---|---|
| $P_2O_5$ | 39.5 |
| CaO | 52.0 |
| $SO_3$ | 0.15 |
| F | 3.20 |
| $S_iO_2$ | 1.19 |
| $CO_2$ | — |
| $Fe_2O_3$ | 0.45 |
| $Al_2O_3$ | 0.71 |
| SrO | 2.14 |

For comparison we have estimated the water balance and operating data for a plant using Western U.S.A. rock as found in Utah and Idaho having approximately the following analysis:

| | |
|---|---|
| $P_2O_5$ | 29.7% |
| CaO | 44.7 |
| $SO_3$ | 1.14 |
| F | 2.68 |
| $SiO_2$ | 9.00 |
| $CO_2$ | 4.82 |
| $Al_2O_3$ | 1.30 |
| $Fe_2O_{1.19}$ | |
| Moisture and waste | 5.53 |

These data assume two plants each producing 300 short tons (2,000 pounds) per day $P_2O_5$ and all data are in short tons per day.

| Gypsum process Plant | | |
|---|---|---|
| Water Input to Plant | | |
| 93% sulfuric acid | | 43 tons/day |
| Filter wash water | | 1142 |
| Total input free water | | 1185 tons/day |
| Water outut from plant | | |
| 1. Product acid - 32% $P_2O_5$ | | |
| $P_2O_5$ | | 300.0 |
| $H_2SO_4$ | | 18.75 |
| $H_2SiFe$ | | 18.75 |
| Misc. impurities | | 37.0 |
| Chemically combined water | | 114.0 |
| Free or dilution water | 449.0 | 449.0 by difference |
| Total 32% product acid | 937.5 | |
| 2. Gypsum waste or tailings | | |
| Water of crystallization | | 294.5 |
| 25% moisture - or free water in cake | | 405.5 |
| Total in gypsum | | 700 |
| 3. Evaporation from Vacuum Cooling system | | 278 |
| Total water output from plant | | 1427 |
| Total water input to plant | | 1185 |
| Water deficit | | 242 |
| Hemihydrate Process Plant | | |
| Water Input to Plant | | |
| 93% sulfuric acid | | 43 |
| Filter wash water | | 977 |
| Total in | | 1020 |

-continued

| Water Output from Plant | | |
|---|---|---|
| 1. Product $P_2O_{300}$ | | |
| Acid $H_2SO_4$ | | 7 |
| $H_2SiF_6$ | | 37 |
| Misc. impurities | | 37 |
| Chemically combined water | | 114 |
| Free or dilution water | 205 | 205(by difference) |
| Total Product acid at 44.8% $P_2O_5$ | | 670 |
| 2. Hemihydrate filter cake (waste) | | |
| 1. Water of crystallization | | 74 |
| 2. Cake moisture | | 553 |
| Total water in cake | | 627 |
| 3. Evaportion from Vacuum cooler | | 188 |
| Total Water Output | | 1020 |
| Total Water Input | | 1020 |
| Total Water Deficit | | None by Assumption |
| Combining the two systems | | |
| 32% Product acid | | 937.5 |
| 45% Product acid | | 670 |
| Less water deficit | | 242 |
| Total product acid | | 1,365.5 |
| $P_2O_5$ Content of Product at 43.9% $P_2O_5$ concentration. | | 600 tons per day |

*Note: Chemically combined water is derived from the sulfuric acid as combined water and does not enter into the water balance.

Thus, it is obvious that lower grade phosphate ores can be used with this technology though there may be some loss in final product concentration. Also, it is obvious that other capacity combinations are possible to a skilled operator.

The operating procedure required to accomplish this follows:

1. Install pipeline A to bring the product acid from the 32% acid to the hemi plant. Part of this product is to be used as the strongest wash on the filter and part is to be used as recycle acid to the hemihydrate digestion system. On the accompanying flow sheet this line is designated as line no. 1.

2. Install a pipeline to return No. 3 filtrate to the gypsum plant to be used as recycle acid in the gypsum process plant as indicated as line 2 in the flow diagram.

With these lines, product acid at 32% $P_2O_5$ concentration can be used as strong wash liquor on the (Landskrona) travelling belt filter and as recycle acid to the hemihydrate digestion system. As is well known to the professional people operating phosphoric acid plants, it is necessary to recycle more than twice as much phosphoric acid ($P_2O_5$) to the digester as is produced as product acid. This includes filter wash liquors, of course, so the volume of strong acid from the filter can, without changing operating conditions, exceed the production of strong acid by a factor of 1.5 to 2.5. This being the case, it is apparent that using the product acid from the gypsum plant does not increase the load on the hemi filter. However, we now cannot return the hemi filter wash liquors to the hemi digester, but they are at the right concentration to return to the gypsum plant as recycle acid. This in turn creates more 32% product acid from the gypsum plant again without increasing the true filter load.

Thus, the hybrid process enables the operator to distribute his available wash water more effectively since he can put more wash water on the hemi filter than would be possible with a simple hemi plant.

The hybrid process offers capital cost advantages over the various recrystallizing process since all of these involve filtering the calcium sulfate twice and in addition, recrystallizing usually takes a larger volume than direct reaction.

The capital cost of two small plants is only slightly larger than for one large plant while the capital cost of evaporation facilities to concentrate the output of a large plant is very substantial. Thus, this new technique can result in a major reduction in the overall capital cost of a project.

This process is particularly advantageous when an existing operator of a gypsum plant wants to expand his capacity since, in this case, the addition of a hemihydrate process plant will enable production of high strength acid from both the new and old facilities.

The accompanying flow diagram shows the method of interconnecting the two plants. There is relatively little difference between a hemihydrate plant and a gypsum process plant. In fact, if properly designed, a plant can operate in either mode. Therefore, in this diagram the two are shown as mirror images for convenience. It should be noted that these flow diagrams contain the essential features required for this mode of operation. Numerous lines which are either desirable or perhaps essential to efficient operation are omitted for the sake of clarity and simplicity in presentation.

One final but perhaps minor advantage is that by mixing gypsum and hemihydrate in the disposal line, there should be fewer scale problems in the line than if only hemihydrate slurry were being pumped. Finally, as the hemihydrate hydrates to gypsum in the waste storage area, it should be more stable than gypsum physically.

What is claimed is:

1. A method of producing phosphoric acid 45–50% $P_2O_5$ content which comprises establishing two processes for the manufacturing of phosphoric acid,
   1. a first gypsum process and
   2. a second hemihydrate process, each producing product phosphoric acid and each having a product stage, filtration stages including wash stages and means for recycling acid,
      a. interconnecting said two processes from the product stage of the first to filtration stage of the second and from filtration stage of the second to the recycling means of the first, and
      b. in the simultaneous operation thereof, reacting, in each process, phosphate rock with concentrated sulfuric acid,
      c. passing said reaction mixture of rock and said sulfuric acid to a filtration stage in each process wherein filtration is accomplished in a sequence of stages,
      d. removing filtrate in said sequence of stages of said filters and employing first filtrate product from the first stage of said sequence of stages of said first process as wash acid for the second stage of said sequence of stages of filtration in said second process and simultaneously employing a third stage filtrate from said second process as recycle acid in said first process.

2. The method in accordance with claim 1 in which all of the product acid of process (1) at about 32% $P_2O_5$ concentration is recycled to the second of filtration in the second process.

3. The method in accordance with claim 1 in which part of the product acid of process (1) at about 32% $P_2O_5$ concentration is recycled to the second of filtration in the second process.

* * * * *